(12) United States Patent
Bess et al.

(10) Patent No.: US 6,805,787 B2
(45) Date of Patent: Oct. 19, 2004

(54) METHOD AND SYSTEM FOR GENERATING HYPOCHLORITE

(75) Inventors: James W. Bess, Sugarland, TX (US); Rudolf C. Matousek, Sugarland, TX (US); Brent Simmons, Campbell, CA (US)

(73) Assignee: Severn Trent Services-Water Purification Solutions, Inc., Ft. Washington, PA (US)

( * ) Notice: Subject to any disclaimer, the term of this patent is extended or adjusted under 35 U.S.C. 154(b) by 396 days.

(21) Appl. No.: 09/948,810

(22) Filed: Sep. 7, 2001

(65) Prior Publication Data

US 2003/0066758 A1 Apr. 10, 2003

(51) Int. Cl.$^7$ ................................................ C25B 1/26
(52) U.S. Cl. ........................ 205/500; 205/464; 205/474; 205/500; 205/412; 205/349
(58) Field of Search ................................ 205/349, 464, 205/474, 500, 412

(56) References Cited

U.S. PATENT DOCUMENTS

| | | |
|---|---|---|
| 633,272 A | 9/1899 | Parker |
| 3,298,946 A | 1/1967 | Forbes |
| 3,324,024 A | 6/1967 | Portman |
| 3,350,286 A | 10/1967 | Crane |
| 3,475,313 A | 10/1969 | Westerlund |
| 3,639,223 A | 2/1972 | Blanchfield et al. |
| 3,732,153 A | 5/1973 | Harke et al. |
| 3,779,889 A | 12/1973 | Loftfield |
| 3,791,947 A | 2/1974 | Loftfield |
| 3,809,629 A | 5/1974 | Messner et al. |
| 3,824,172 A | 7/1974 | Hodges |
| 3,849,281 A | 11/1974 | Bennett et al. |
| 3,864,237 A | 2/1975 | Loftfield |
| 3,902,985 A | 9/1975 | Raetzsch et al. |
| 3,925,174 A | * 12/1975 | Eng et al. ................ 205/500 |
| 3,948,748 A | 4/1976 | Messner et al. |
| 3,974,051 A | 8/1976 | Elliott et al. |
| 3,997,414 A | 12/1976 | Casson et al. |
| 4,060,475 A | 11/1977 | Fournier et al. |

(List continued on next page.)

OTHER PUBLICATIONS

Van Nostrand Reinhold, The Handbook of Chlorination and Alternative Disinfectants, 1992, no month avail.

Primary Examiner—Wesley A. Nicolas
(74) Attorney, Agent, or Firm—D'Ambrosio & Associates PLLC (57) ABSTRACT

In a method for producing sodium hypochlorite, brine solution is piped from the brine tank to a first inlet in a first electrolyzer cell of an electrolyzer assembly while simultaneously piping chilled water from a chiller having a temperature range from about 10° C. to about 25° C. to the first inlet so that the brine solution combines with the chilled water. The chilled brine solution is electrolyzed in the first electrolyzer cell. The hypochlorite and brine solution resulting from electrolysis occurring in the first cell is piped to a second inlet in a second electrolyzer cell in the electrolyzer assembly while simultaneously piping chilled water from the chiller having a temperature range from about 10° C. to about 25° C. to the second inlet so that the chilled water combines with the hypochlorite and brine solution. Each cell can have more than one inlet, preferably up to 6 inlets. The chilled hypochlorite and brine solution are electrolyzed in the second cell. The process is repeated until the hypochlorite and brine solution passes through all cells of the electrolyzer assembly.

35 Claims, 3 Drawing Sheets

U.S. PATENT DOCUMENTS

| | | |
|---|---|---|
| 4,107,023 A | 8/1978 | Mentz |
| 4,118,307 A | 10/1978 | LaBarre |
| 4,139,449 A | 2/1979 | Goto et al. |
| 4,151,052 A | 4/1979 | Goto et al. |
| 4,194,953 A | 3/1980 | Hatherly |
| 4,218,293 A | 8/1980 | Nawrot |
| 4,230,569 A | 10/1980 | Lohrberg et al. |
| 4,248,690 A | 2/1981 | Conkling |
| 4,329,215 A * | 5/1982 | Scoville .................. 204/228.2 |
| 4,332,648 A | 6/1982 | Spore |
| 4,364,814 A | 12/1982 | Langley |
| 4,414,088 A | 11/1983 | Ford |
| 4,469,576 A | 9/1984 | Akazawa et al. |
| 4,488,945 A | 12/1984 | Spaziante |
| 4,495,048 A | 1/1985 | Murakami et al. |
| 4,783,246 A | 11/1988 | Langeland et al. |
| 5,294,307 A | 3/1994 | Jackson |
| 5,779,876 A | 7/1998 | Traini et al. |

\* cited by examiner

METHOD AND SYSTEM FOR GENERATING HYPOCHLORITE

FIELD OF THE INVENTION

This invention relates generally to method and system for producing hypochlorite. More specifically, this invention relates to the generation of hypochlorite by electrolysis.

BACKGROUND OF THE INVENTION

Chlorine in the form of hypochlorite was first used for disinfecting water systems in London after an outbreak of cholera in 1850. For the past century, chlorination has become the standard way to disinfect water supplies, potable water, wastewater treatment and swimming pools, for example to eliminate epidemic waterborne diseases. The traditional way to disinfect water with chlorine was through the use of chlorine gas. Transporting bulk chlorine on crowded highways and into residential areas has become a major safety concern since the transport of chlorine gas under high pressure can be very hazardous. Also, the transport of commercial hypochlorite, which is predominantly water, is very expensive. Stringent regulation of toxic gasses and accidental releases of chlorine and higher costs have caused alternative sources for chlorine to be sought for water disinfection. Production of a chlorine source, on-site, is currently the best option for obtaining a less expensive and safer source.

On-site generation has proven itself as a safe and cost efficient process for providing for the chlorine needs of water treatment facilities. On-site hypochlorite generation has been accomplished by different means in the past. The preferred on-site reaction is creating sodium hypochlorite (NaOCl) according to the following equation:

The chemical reaction is $NaCl+H_2O+2e \rightarrow NaOCl+H_2$.

One method used an alkali metal chlorate cell using solid salt as disclosed in U.S. Pat. No. 3,849,281 given to Bennett et al. U.S. Pat. No. 3,902,985 given to Raetzsch et al teaches the use of a cell with higher temperatures so that a brine feed solution can be used instead of a solid salt feed. Goto et al., in U.S Pat. No. 4,151,052, discloses a process of producing sodium hypochlorite comprising electrolyzing an aqueous solution of sodium chloride. Goto, in '052 teach the use of at least one cooling means in or between the electrolytic cells to cool the electrolyte solution preferably between 5° C. and 45° C. for an increase in available chlorine.

The amount of available chlorine in the resulting solution can be found by the equation.

Amount of Available Chlorine (g/L)=2×(chlorine in NaClO)

It is the amount of available chlorine that determines the efficiency of the process. Competing reactions occur in the resulting sodium hypochlorite produced from the initial reaction. The amount of sodium hypochlorite lost to side reactions is proportional to greater concentrations of available chlorine and higher temperatures. The temperature of aqueous solutions used in the reaction has been found to make a difference in the resulting amount of sodium hypochlorite produced. Lower temperatures decrease the amount of side reactions that occur.

Murakami et al. in U.S. Pat. No. 4,495,048 discloses a three-compartment electrolytic cell using bipolar electrodes for the electrolysis of salt water. The '048 reference teaches the use of heat exchange gaskets contained within the cell.

U.S. Pat. No. 3,997,414 given to Casson et al. teaches a cooled cell chamber. Casson '414 discloses a chamber for the circulation of an electrolytic solution comprised of a cooling chamber and a concentration chamber adjacent to the electrode assembly. The cooling and concentration chamber are connected by conduits in the cell.

In a process for the electrolysis of sea water to produce hypochlorite, Spaziante, in U.S. Pat. No. 4,488,945, suggests mixing sea water at temperatures below 9.6° C. before electrolysis with recycled warmed hypochlorite solution to increase the temperature of the sea water mixture.

U.S. Pat. No. 5,294,307 given to Jackson discloses a cell that produces chlorine dioxide and alkali chlorates as its products from a recycled alkali hypochorate solution at temperatures preferably between 85° C. and 95° C.

What is needed is an on-site means of producing sodium hypochlorite at greater efficiency with reduced energy and feed product consumption.

SUMMARY

The present method and system generates sodium hypochlorite or potassium hypochlorite, in terms of available chlorine, more efficiently. Increased efficiency is measured by an increase in the percentage of sodium or potassium chloride converted to hypochlorite during the electrolytic process and a decrease in power consumption. Higher temperatures of the solution during electrolysis and increased concentrations of available chlorine enhance the probability of a shift in kinetics to form undesirable by products. The amount of available chlorine, the desired end product, is reduced. Because of these side reactions, more sodium chloride and electric current must be consumed to produce an equal amount of available chlorine. Advantageously, during the method of this invention, the heat generated during the electrolysis process is abated by first chilling the influent water in a chiller separate from the electrolyzer assembly and then piping the chilled water to one or more inlets to the electrolyzer cells within the electrolyzer assembly. The additional water not only reduces the temperature but also dilutes the sodium chloride/sodium hypochlorite solution resulting from electrolysis. Side reactions are reduced thereby allowing greater production of available chlorine. The efficiency of the method can be increased so that the efficiency is within a range of from about 70% to about 80%. Improved efficiency translates to cost savings in terms of feed product and electric power consumption.

One preferred method and system can generate potassium hypochlorite by using a potassium salt as the starting product. A preferred system for generating sodium hypochlorite comprises an electrolyzer assembly having at least one electrolyzer cell. In another preferred system, the electrolyzer assembly can have up to 10 electrolyzer cells or tubes stacked one upon another. Each electrolyzer cell comprises compartments having unseparated anode and cathode plates. The number of anode/cathode compartments can range from about 1 compartment to about 15 compartments, preferably 4 to 12 compartments per cell. By piping chilled water to multiple inlets to the electrolyzer assembly, the heat produced during electrolysis is abated and the temperature within the electrolyzer cell is reduced, thereby reducing the side reactions, which consume available chlorine. Preferably, each electrolyzer cell within an electrolyzer assembly has at least one inlet and an outlet. Depending on its size, each tube or cell can have from 1 to 6 inlets and, in some embodiments, up to 10 inlets for receiving water to cool down the temperatures within the cell. The system can further comprise a chiller for cooling water and piping to transport the chilled water to the inlet(s) of each electrolyzer cell within the electrolyzer assembly. The salt solution for the electrolysis process is piped to the electolyzer assembly from a brine tank. Solid salt within the brine tank mixes with water piped to the brine tank from a water softener unit. The water sent to the chiller can also be softened within the water softener unit prior to being piped to the chiller.

During one preferred method for producing sodium hypochlorite, brine solution is piped from the brine tank to a first inlet in a first electrolyzer cell of an electrolyzer assembly while chilled water is simultaneously piped from a chiller to the first inlet so that the brine solution combines with the chilled water at the entry point to the cell. The chilled brine solution in the first electrolyzer cell is electrolyzed to produce sodium hypochlorite and hydrogen. The hydrogen is contained and vented to the atmosphere. In this method, the electrolyzer assembly can comprise one or more electrolyzer cells and each electrolyzer cell can have more than one inlet for receiving water. In one preferred method, the electrolyzer cell can comprise up to six inlets, each receiving additional water for diluting and chilling the sodium chloride/sodium hypochlorite solution. The hypochlorite and brine solution resulting from the electrolysis in the first electrolyzer cell is piped to an inlet in a second electrolyzer cell in the electrolyzer assembly. Simultaneously chilled water from the chiller is piped to the second inlet so that the chilled water combines with the hypochlorite and brine solution upon entering the second electrolyzer cell thereby diluting the solution and abating the heat caused by the electrolysis process. The chilled hypochlorite and brine solution in the second cell is than electrolyzed. This process is repeated until the hypochlorite and brine solution passes through all cells of the electrolyzer assembly.

In an alternative embodiment of the method for producing sodium hypochlorite, the method comprises piping water to a water softener unit to reduce the calcium and magnesium content and piping a portion of the softened water to a brine tank containing solid salt to form a brine solution comprising salt within a range of between 20 weight per cent and saturation, and piping a second portion of the softened water to a chiller.

The brine solution is piped from the brine tank to a first inlet in a first electrolyzer cell of an electrolyzer assembly while simultaneously piping chilled water from the chiller having a temperature range from about 10° C. to about 25° C. to the first inlet so that the brine solution combines with the chilled water, and electrolyzing the chilled brine solution in the first electrolyzer cell. The hypochlorite and brine solution resulting from electrolysis occurring in the first cell is piped to a second inlet in a second electrolyzer cell in the electrolyzer assembly while simultaneously piping chilled water from the chiller having a temperature range from about 10° C. to about 25° C. to the second inlet so that the chilled water combines with the hypochlorite and brine solution. Each cell can have more than one inlet, preferably up to 6 inlets. The chilled hypochlorite and brine solution is electrolyzed in the second cell.

The hypochlorite and brine solution resulting from electrolysis in the second cell is piped to a third inlet in a third electrolyzer cell of the electrolyzer assembly while simultaneously piping chilled water from the chiller having a temperature range from about 10° C. to about 25° C. to the third inlet so that the chilled water combines with the hypochlorite and brine solution. The resulting chilled hypochlorite and brine solution is electrolyzed in the third cell. The process is repeated until the hypochlorite and brine solution passes through all cells of the electrolyzer assembly and the effluent solution from the last cell comprises sodium hypochlorite within a range of approximately 5 g/l to approximately 15 g/l and sodium chloride within a range of approximately 12 g/l to approximately 25 g/l.

DETAILED DESCRIPTION OF THE INVENTION

According to the practice of the method of this invention, heat that is typically produced during the electrolysis of sodium chloride to generate sodium hypochlorite is abated by first chilling the influent water in a chiller separate from the electrolyzer assembly and then piping the chilled water to one or more inlets to the electrolyzer cells within the electrolyzer assembly. The additional chilled water not only reduces the temperature but also dilutes the sodium chloride/sodium hypochlorite solution resulting from electrolysis, thereby allowing greater production of available chlorine. Higher temperatures of the solution during electrolysis and increased concentrations of available chlorine enhance the probability of a shift in kinetics to form undesirable by products. The amount of available chlorine, the desired end product, is reduced. Because of these side reactions, more sodium chloride and electric current must be consumed to produce an equal amount of available chlorine. Reduction of temperature and dilution of the sodium chloride/sodium hypochlorite solution reduces the side reactions thereby increasing available chlorine. The current efficiency of one preferred method is within a range from about 70% to about 80%. Table 1, attached hereto, is a performance data sheet of tests of the method and illustrates the increase in current efficiency during the practice of this invention. Its results are discussed below. Current efficiency is the measurement of available chlorine produced during electrolysis in relation to the power or current consumed is based on Faraday's law. In the practice of the method of this invention, the starting salt can be potassium chloride resulting in the production of potassium hypochlorite.

Figure 1:
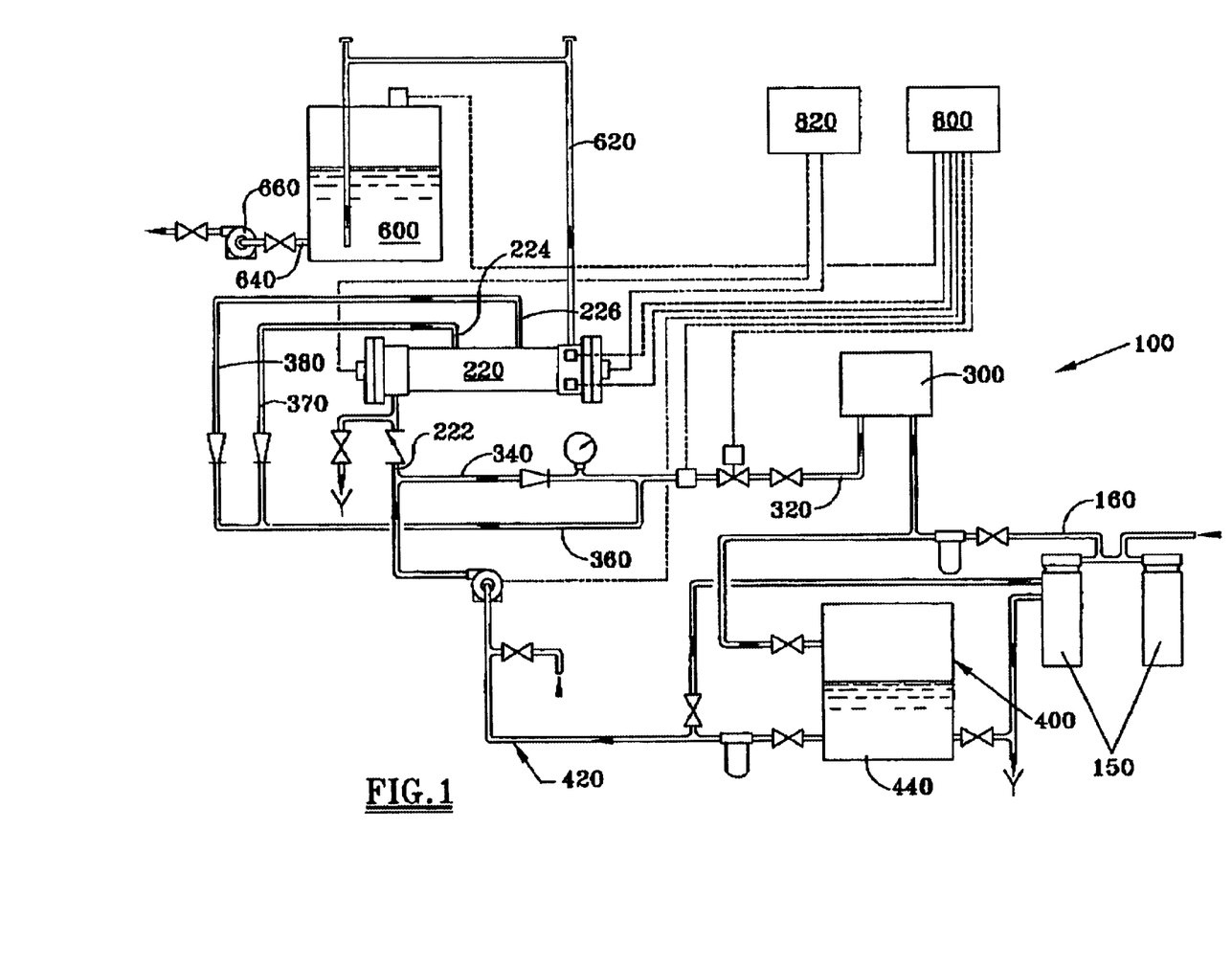
FIG. 1 is a schematic of one embodiment of this invention having one electrolyzer cell.
Figure 2:
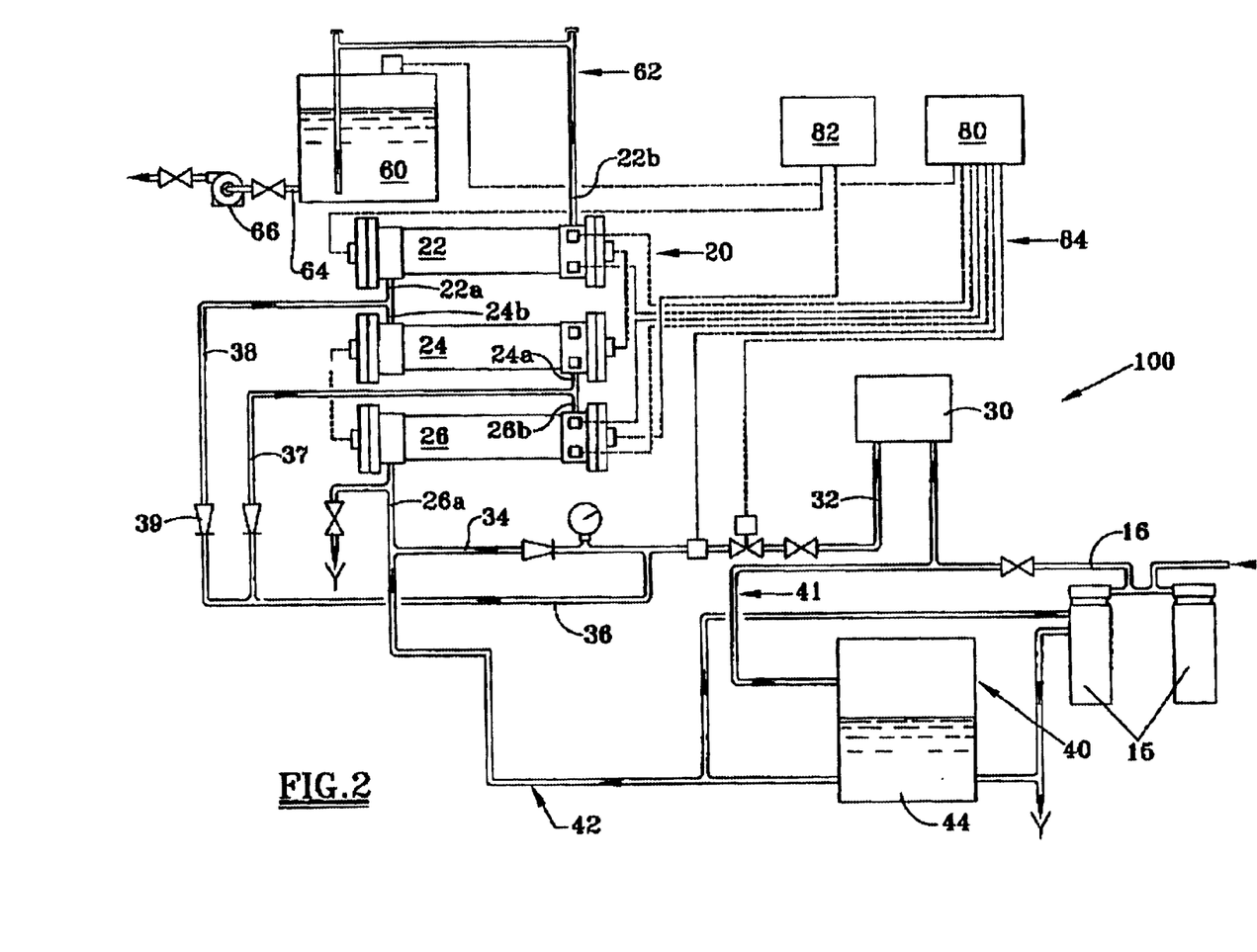
FIG. 2 is a schematic of one embodiment of this invention having multiple electrolyzer cells.
Figure 3:
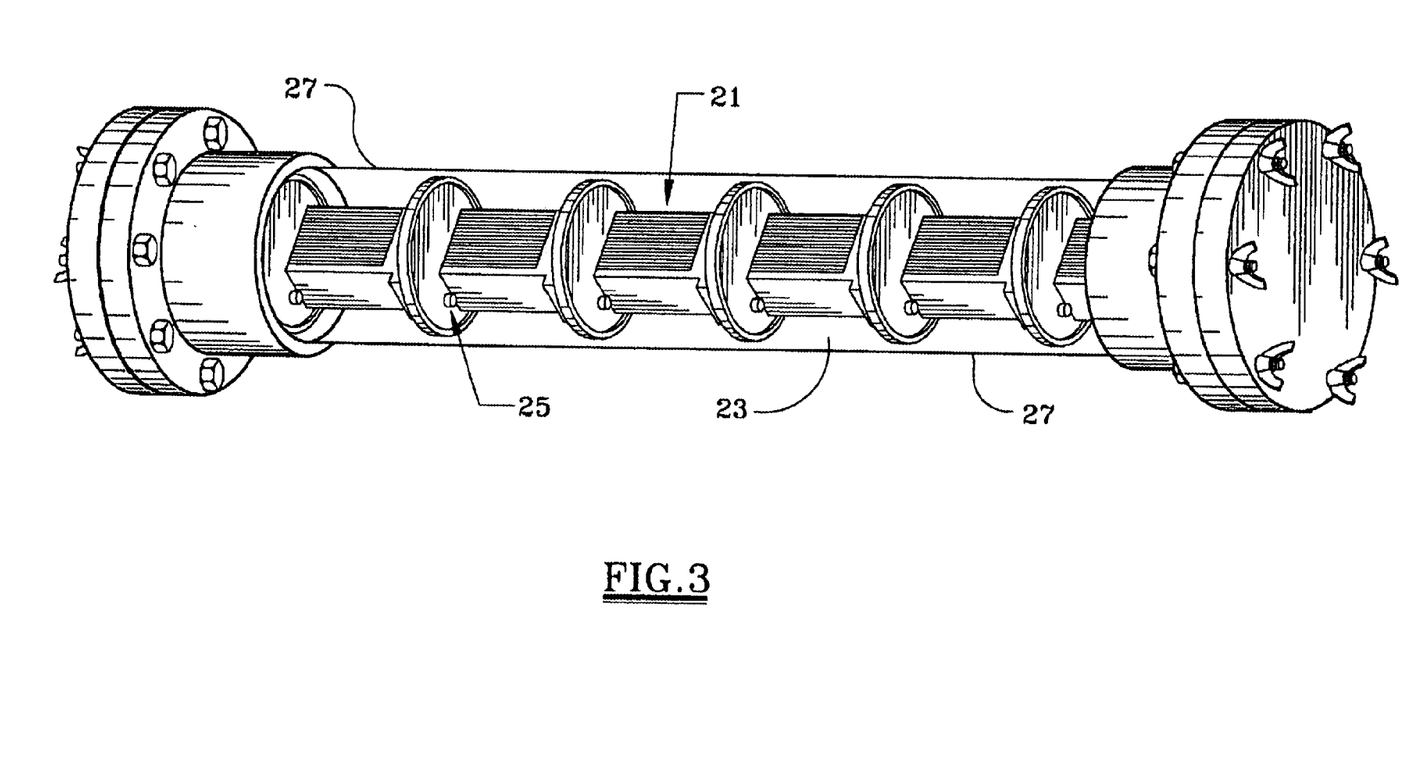
FIG. 3 is a three dimensional view of one electrolyzer cell.

Referring to FIG. 1, one preferred system 10 for generating sodium hypochlorite comprises an electrolyzer assembly 20 having at least one electrolyzer cell 22. In another preferred system depicted in FIG. 2, the electrolyzer assembly 20 can have up to 10 electrolyzer cells 22, 24, 26 or tubes stacked one upon another. Referring to FIG. 3, each electrolyzer cell 22 comprises compartments 23 having unseparated anode and cathode plates 21.

The electrolyzer cell is manufactured and available from Severn Trent Services-Water Purification Solution Inc. The number of anode/cathode compartments 23 can be within a range of from about 1 compartment to about 15 compartments 23, preferably 4 to 12 compartments 23 per cell 22 depending on the length of the cell 22. Each compartment 23 comprises from 5 to 25 bipolar plates 21. By piping chilled water from a chiller 30 to multiple inlets 22a, 24a, 26a to the electrolyzer assembly 20, the heat produced during electrolysis is abated and the temperature within the electrolyzer cell is reduced, thereby reducing the side reactions which consume available chlorine.

Preferably, each electrolyzer cell 22 within an electrolyzer assembly has at least one inlet 22a and an outlet 22b.

Depending on its size, each tube or cell 22 can have from 1 to 6 inlets 22a and, in some embodiments, up to 10 inlets 22a for receiving water to cool down the temperatures within the cell 22. The system 10 can further comprises a chiller 30 for cooling water and piping 32 to transport the chilled water to the inlet(s) 22a, 24a, 26a of each electrolyzer cell 22, 24, 26 within the electrolyzer assembly 20. Chilled water traveling in the pipeline 32 from the chiller 30 is diverted to three or more pipelines, depending on the number of inlets leading to the electrolyzer assembly. The first pipeline 34 leads to the first inlet 26a of the first electrolyzer cell 26, the second pipeline 37 leads to the second inlet 24a of the second electrolyzer cell 24 and the third pipeline 38 carries chilled water to the third inlet 22a of the third electrolyzer cell 22. Additional pipelines can be used to pipe the chilled water directly to inlets if the assembly 20 has additional cells or if each cell has multiple inlets. Temperature of the electrolytic process is an important factor in terms of efficiency. Heat generated during electrolysis increases the temperature within the cell 22 about 20° C. When the temperature increases to above 40° C., side reactions occur which decrease current efficiency. If the temperatures are below 10° C., the reaction shifts to generate more oxygen thereby decreasing current efficiency. In a preferred embodiment, the temperature of the chilled water piped to the first inlet 26a, the second inlet 24a and the third inlet 22a is within a range between approximately 10° C. and approximately 25° C. and more preferably, the temperature range of the chilled water is between approximately 15° C. and approximately 20° C. Current efficient is improved thereby saving costs in terms of lower expenditures for feed product (by an increased conversion of sodium chloride to sodium hypochlorite) and electric power consumption.

Solid salt within a brine tank 40 combines with water piped to the brine tank from a water softener unit 15. The solid salt can be in the form of sea salt or mined salt. Water is treated in the water softener unit 15 to remove calcium and magnesium. These impurities are prone to form insulating precipitates between the electrodes, which inhibit the electrolytic process. This reduces the conversion efficiency and increases maintenance costs. Salt solution 44 for the electrolysis process is piped to the electolyzer assembly 20 from the brine tank 40 through pipelines 42 and mixes with chilled water coming from the first pipeline 34 at the first inlet 26a. Water sent to the chiller 30 can also be softened within the water softener unit 15 prior to being piped to the chiller 30. In one embodiment, about 80% to 95% of the water from the water softener unit 15 is sent to the chiller and the remaining 5% to 20% of the water is piped to the brine tank 40. Both the chiller 30 and the water softener unit 15 are known in the art and readily available. The system 10 is controlled by an operator-controlled computer 80. Electrical current required for electrolysis is sent to a rectifier 82 to convert alternating current to direct current and delivered to each cell by power wiring 84 illustrated in the drawings by broken lines. The end product, sodium hypochlorite is piped 62 to a storage tank 60 and then to a user's system that requires disinfecting by a dosing pump 66.

During one preferred method for producing sodium hypochlorite, brine solution 44, preferably sodium chloride solution at approximately 300 g/l, is piped from the brine tank 40 to a first inlet 26a in a first electrolyzer cell 26 of an electrolyzer assembly 20 while chilled water is simultaneously piped from a chiller 30 to the first inlet 26a so that the brine solution 44 combines with the chilled water at the entry point to the cell. In one embodiment, the salt concentration of the brine solution 44 piped to the first inlet 26a is within a range between approximately 20 wt. per cent and saturation. When combined with the chilled water from the first pipeline 34, the chilled water/brine solution entering the first electrolyzer cell 26 comprises sodium chloride within a range of approximately 20 g/l to approximately 200 g/l. Alternatively, the chilled water/brine solution entering the first electrolyzer cell 26 comprises a range of from about 100 g/l sodium chloride to about 200 g/l sodium chloride. The chilled brine solution in the first electrolyzer cell 26 is electrolyzed to produce sodium hypochlorite and hydrogen. The hydrogen is contained and vented to the atmosphere. In this method, the electrolyzer assembly 20 can comprise one or more electrolyzer cells 22, 24, 26 and each electrolyzer cell can have more than one inlet for receiving water 22a, 24a, 26a. In one preferred method, the electrolyzer cell can comprise up to six (6) inlets, each receiving additional water for diluting and chilling of the sodium chloride/sodium hypochlorite solution. During the method of this invention, the hypochlorite and brine solution resulting from the electrolysis in the first electrolyzer cell 26 is piped to an inlet 24a in a second electrolyzer cell 24 in the electrolyzer assembly 20. Simultaneously chilled water from the chiller 30 is piped to the second inlet 24a so that the chilled water combines with the hypochlorite and brine solution upon entering the second electrolyzer cell 24 thereby diluting the solution and abating the heat caused by electrolysis. The chilled hypochlorite and brine solution in the second cell 24 is than electrolyzed. This process is repeated until the hypochlorite and brine solution passes through each of the cells within the electrolyzer assembly.

Preferably, the electrolyzer cell is a hypochlorite cell comprising unseparated anode and cathode plates. As shown in FIG. 3, the electrolyzer cell 22 is divided into anode/cathode compartments 23 for containing the electrodes 21 within a casing. The number of compartments are within a range of from about 1 compartment 23 to about 15 compartments 23, preferably 4 to 12 compartments, depending on the size of the casings, and the cell's chlorine production capacity. Each compartment 23 is segmented from other compartments by a partition 25. The brine, electrolyte and hypochlorite pass through each successive compartment during the electrolytic process. The amount of hypochlorite increases as the solutions pass through the progressive compartments while electrolysis continues. The cells are arranged in bipolar configuration. Brine 44 from the brine tank 40 is piped to an inlet pipe 26a of the first cell 26 in an electrolyzer assembly 20 and mixes with chilled water piped 34 from the chiller 30. The combined brine/chilled water solution enters the casings 27 and floods the cell 26. A DC current impressed upon the electrolyzer 20 converts the sodium chloride to molecular chlorine and sodium hypochlorite. Unreacted brine and hydrogen gas, a product of electrolysis, remain in the solution until the hydrogen gas is removed from the generation zone by thermal convection, passes through gas ports in the compartment partitions 25 and is finally vented to the atmosphere. The electrolysis reaction is as follows:

The brine, electrolyte and hypochlorite pass from one compartment 23 to the next through ports located below the solution level. In multiple cell electrolyzer assemblies 20, the brine and hypochlorite solution passes through an outlet connection 26b from the first cell 26 and is piped to the inlet 24a of the next electroylyzer cell 24 where it mixed with chilled water piped 37 from the chiller 30. In the final cell, the brine, electrolyte and sodium hypochlorite together with any remaining hydrogen gas are piped 62 to the storage tank 60 which is designed to scavenge the hydrogen from the final product. A dosing pump 66 will pump the hypochlorite to a user system requiring disinfecting, a wastewater tank or commercial swimming pool for example.

The current density within the electrolyzer assembly is preferably within a range of from approximately 0.5 amps per square inch to 2 amps per square inch, and more advantageously, the current density is 1.2 amps per square inch. In one preferred embodiment, the composition of the effluent solution exiting the electrolyzer assembly comprises sodium hypochlorite within a range of approximately 5 g/l to approximately 15 g/l and sodium chloride within a range of approximately 12 g/l to approximately 25 g/l. Preferably, the composition of the effluent solution exiting the electrolyzer assembly comprises approximately 10 g/l sodium hypochlorite and approximately 15 g/l sodium chloride. This method of generating sodium hypochlorite, in terms of available chlorine, is more efficient than previous methods that do not introduce chilled water at multiple inlets to the electrolyzer assembly. Increased efficiency is measured by a reduction in the amount of feed product, sodium chloride for example, consumed during the process and a decrease in power consumption. Because of side reactions occurring at higher temperatures, more sodium chloride and electric current must be consumed to produce available chlorine. During the method of this invention, the heat generated during electrolysis is abated by adding chilled water at various inlets. The additional water not only reduces the temperature but also dilutes the sodium chloride/sodium hypochlorite solution resulting from electrolysis, thereby allowing greater production of available chlorine. The current efficiency of this method is preferably within a range of from about 70% to about 80%.

In one preferred embodiment 100, as depicted in FIG. 1, the electrolyzer assembly comprises one electrolyzer cell. Brine solution from the brine tank is piped to a first inlet in an electrolyzer cell 220 of a one-cell electrolyzer assembly. The electrolyzer cell 220 comprises at least two inlets 222, 224, and in some cases up to 6 inlets. Chilled water is simultaneously piped from the chiller 300 having a temperature range from about 10° C. to about 25° C. to the first inlet 222 so that the brine solution combines with the chilled water, and the chilled water/brine solution is electrolyzed within the compartments of the electrolyzer cell 220. Chilled water from the chiller 300 having a temperature range from about 10° C. to about 25° C. is piped to a second inlet 224, the second inlet 224, distal to the first inlet 222, so that the chilled water combines with the resulting hypochlorite and brine solution within the compartments. The chilled hypochlorite and brine solution is continuously electrolyzed. Chilled water is piped to the remaining inlets of the cell until the hypochlorite and brine solution passes through all compartments of the one-cell electrolyzer assembly.

The practice of this invention can occur in geographic areas where the ambient temperatures drop below 15° C. In one preferred method for producing sodium hypochlorite under these conditions, water does not have to be chilled prior to piping to the electrolyzer assembly. In fact, water is preferably heated to 15° C. or above by a heater prior to being piped to the first inlet. Additional water does not have to be heated, this is a beneficial cost savings. In the practice of this method, water, the temperature of which under ambient conditions, is 15° C. or below, is piped to a water softener unit to reduce the calcium and magnesium content, and the softened water piped to a brine tank, the water combining with solid salt within the tank to form a brine solution. The brine solution is piped to a first inlet in a first electrolyzer cell of an electrolyzer assembly while water that is warmed to temperature of at least 15° C. by a heater is simultaneously piped to the first inlet so that the brine solution combines with the warmed water, and electrolysis of the brine solution in the first electrolyzer cell takes place.

The hypochlorite and brine solution resulting from the electrolysis process occurring in the first cell is piped to a second inlet in a second electrolyzer cell in the electrolyzer assembly while simultaneously piping water at ambient temperature of 15° C. or below to the second inlet so that the water combines with the hypochlorite and brine solution, and electrolyzing the hypochlorite and brine solution. This process continues so that ambient temperature water is piped to all the inlets of the electrolyzer assembly during electrolysis until the hypochlorite and brine solution passes through all cells of the electrolyzer assembly.

The following example illustrates the test results for sodium hypochlorite produced according to the method of this invention.

EXAMPLE

See Table A, Attached Hereto

Referring to Table A. An electrolyzer cell comprising three inlets was fed with a brine solution at various times over a period of approximately 40 day. The brine was electrolyzed. During the first twelve days, brine solution was fed to the first inlet only and temperatures were at ambient conditions. The water was unsoftened for the first series of tests and then water was sent to a softener prior to mixing with solid salts. An ambient baseline average was calculated. The ambient temperature at the first cell inlet was 26.4° C. The sodium hypochlorite produced in pounds per day was 66.0 lbs/day. The current efficiency, derived by dividing the available chlorine 7.6 g/l by the theoretical chlorine determined under Faraday's Law, 12.1 g/l, was 63.1.

After the 8$^{th}$ day, chilled water was added to the first inlet along with the brine solution. Eight test runs were conducted. The chiller baseline averages for production of sodium hypochlorite using additional chilled water at the first inlet only were as follows: the cell inlet temperature was 13.19° C., 73.02 lbs/day of sodium hypochlorite were produced and the current efficiency was 69.61.

During the next set of tests, the chilled water was added at both inlets. Thirteen tests were conducted with the chilled water flow split between the two inlets to the electrolyzer cell. The average of the test results with chilled water fed to both inlets are as follows: cell inlet temperatures were 17.00° C., 78.45 lbs/day of sodium hypochlorite were produced and the average current efficiency was 74.32%.

The foregoing description is illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

TABLE A

| Date | Time | Hour Meter | DC Amps | DC Volts | Power Cons. DC | Cell Inlet Temp | Cell Outlet Temp | Flow Rate liter/min | NaCl GPL | Eff. Grams NaCl/NaOCl | NaOCl Titrant (ml/Thlo) | NaOCl GPL | NaOCl Lb/Day | GPL Theo. | Current Eff. % |
|---|---|---|---|---|---|---|---|---|---|---|---|---|---|---|---|
| May 11, 2001 | 16:00 | 629.0 | 240 | 21.88 | 2.10 | 26.0 | 45.0 | 2.70 | 24.5 | 3.49 | 9.9 | 7.02 | 60.1 | 11.8 | 59.7 |
| May 14, 2001 | 15:15 | 635.5 | 250 | 22.63 | 2.19 | 27.0 | 47.0 | 2.76 | 24.0 | 3.39 | 10.0 | 7.09 | 62.1 | 12.0 | 59.2 |
| May 15, 2001 | 8:45 | 637.8 | 250 | 22.27 | 2.04 | 24.0 | 43.0 | 2.72 | 29.0 | 3.82 | 10.7 | 7.59 | 65.4 | 12.2 | 62.4 |
| May 15, 2001 | 11:30 | 639.7 | 250 | 21.89 | 2.04 | ??? | 44.0 | 2.72 | 28.5 | 3.83 | 10.5 | 7.44 | 64.2 | 12.2 | 61.2 |
| May 15, 2001 | 14:00 | 642.2 | 250 | 22.03 | 1.96 | 27.0 | 45.0 | 2.80 | 28.0 | 3.69 | 10.7 | 7.59 | 67.4 | 11.8 | 64.2 |
| May 15, 2001 | 16:00 | 643.8 | 250 | 21.75 | 1.98 | 27.0 | 45.0 | 2.76 | 28.0 | 3.73 | 10.6 | 7.52 | 65.8 | 12.0 | 62.7 |
| May 16, 2001 | 11:30 | 651.3 | 250 | 21.12 | 1.94 | 26.0 | 44.0 | 2.72 | 29.0 | 3.82 | 10.7 | 7.59 | 65.4 | 12.2 | 62.4 |
| May 16, 2001 | 16:10 | 655.8 | 250 | 22.02 | 1.97 | 27.0 | 45.5 | 2.76 | 28.0 | 3.66 | 10.8 | 7.66 | 67.0 | 12.0 | 63.9 |
| May 17, 2001 | 9:30 | ??? | 248 | 22.00 | 1.89 | ??? | 42.0 | 2.80 | 29.0 | 3.72 | 11.0 | 7.80 | 69.3 | 11.7 | 66.6 |
| May 17, 2001 | 13:10 | 664.3 | 250 | 21.77 | 1.92 | 27.0 | 44.5 | 2.80 | 29.0 | 3.79 | 10.8 | 7.66 | 68.0 | 11.8 | 64.8 |
| May 17, 2001 | 16:40 | 667.4 | 250 | 21.78 | 1.93 | 27.0 | 45.5 | 2.76 | 29.0 | 3.75 | 10.9 | 7.73 | 67.7 | 12.0 | 64.5 |
| May 18, 2001 | 10:00 | 669.5 | 250 | 21.99 | 1.95 | 25.0 | 43.0 | 2.73 | 29.0 | 3.72 | 11.0 | 7.80 | 67.5 | 12.1 | 64.4 |
| May 18, 2001 | 15:15 | 674.1 | 250 | 21.75 | 1.86 | 27.0 | 45.0 | 2.78 | 29.0 | 3.65 | 11.2 | 7.94 | 70.0 | 11.9 | 66.7 |
| May 23, 2001 | 10:00 | 692.1 | 250 | 21.41 | 1.93 | 25.0 | 42.5 | 2.66 | 29.0 | 3.68 | 11.1 | 7.87 | 66.4 | 12.4 | 63.3 |
| May 23, 2001 | 16:35 | 697.7 | 250 | 21.23 | 1.91 | 27.0 | 44.5 | 2.72 | 29.0 | 3.75 | 10.9 | 7.73 | 66.7 | 12.2 | 63.6 |
| May 25, 2001 | 14:00 | 711.5 | 250 | 21.66 | 2.04 | 27.0 | 44.5 | 2.60 | 29.0 | 3.75 | 10.9 | 7.73 | 63.7 | 12.7 | 60.7 |
| AVERAGE VALUES | | | 249.25 | 21.82 | 1.98 | 26.4 | 44.4 | 2.74 | 28.2 | 3.7 | 10.7 | 7.6 | 66.0 | 12.1 | 63.1 |
| Jun. 1, 2001 | 9:35 | 725.9 | 250 | 24.15 | 1.96 | 13.0 | 36.0 | 2.65 | 25.5 | 2.90 | 12.4 | 8.79 | 73.9 | 12.5 | 70.4 |
| Jun. 1, 2001 | 11:10 | 727.4 | 250 | 24.46 | 2.01 | 13.0 | 35.5 | 2.68 | 25.5 | 2.97 | 12.1 | 8.58 | 72.9 | 12.3 | 69.5 |
| Jun. 1, 2001 | 13:10 | 729.4 | 250 | 24.42 | 2.02 | 13.5 | 35.5 | 2.65 | 25.5 | 2.95 | 12.2 | 8.65 | 72.7 | 12.6 | 69.3 |
| Jun. 1, 2001 | 14.10 | 730.3 | 250 | 24.15 | 1.99 | 13.5 | 35.5 | 2.66 | 28.0 | 3.24 | 12.2 | 8.65 | 73.0 | 12.4 | 69.6 |
| Jun. 5, 2001 | 16:00 | 738.0 | 250 | 23.88 | 1.91 | 13.0 | 35.0 | 2.65 | 28.0 | 3.13 | 12.6 | 8.93 | 75.1 | 12.5 | 71.6 |
| Jun. 6, 2001 | 13:00 | 744.4 | 250 | 24.87 | 2.09 | 13.0 | 37.0 | 2.63 | 24.0 | 2.80 | 12.1 | 8.58 | 71.6 | 12.6 | 68.2 |
| Jun. 6, 2001 | 16:00 | 747.3 | 250 | 24.81 | 2.09 | 13.5 | 37.0 | 2.64 | 24.0 | 2.82 | 12.0 | 8.51 | 71.2 | 12.5 | 67.9 |
| Jun. 7, 2001 | 14:00 | 750.7 | 250 | 24.80 | 2.02 | 13.0 | 36.5 | 2.69 | 24.5 | 2.83 | 12.2 | 8.65 | 73.8 | 12.3 | 70.3 |
| AVERAGE VALUES | | | 250 | 24.44 | 2.01 | 13.19 | 36.00 | 2.66 | 25.63 | 2.96 | 12.23 | 8.67 | 73.02 | 12.45 | 69.61 |
| Jun. 15, 2001 | 16:30 | 791.8 | 270 | 23.40 | 1.79 | 15.5 | 34.5 | 3.06 | 25.0 | 2.87 | 12.3 | 8.72 | 84.6 | 11.7 | 74.7 |
| Jun. 18, 2001 | 10:00 | 793.1 | 250 | 22.22 | 1.69 | 18.0 | 35.0 | 2.92 | 27.0 | 3.17 | 12.0 | 8.51 | 78.8 | 11.3 | 75.1 |
| Jun. 18, 2001 | 10:40 | 793.7 | 250 | 22.50 | 1.71 | 16.5 | 34.0 | 2.88 | 26.0 | 3.01 | 12.2 | 8.65 | 79.0 | 11.5 | 75.3 |
| Jun. 18, 2001 | 13:00 | 796.0 | 250 | 22.94 | 1.75 | 16.0 | 33.5 | 2.92 | 26.0 | 3.06 | 12.0 | 8.51 | 78.8 | 11.5 | 75.1 |
| Jun. 18, 2001 | 14:15 | 797.3 | 250 | 22.72 | 1.77 | 16.5 | 34.0 | 2.80 | 26.0 | 3.01 | 12.2 | 8.65 | 76.8 | 11.8 | 73.2 |
| Jun. 18, 2001 | 15:00 | 798.1 | 250 | 22.57 | 1.70 | 16.0 | 33.5 | 2.88 | 26.0 | 2.98 | 12.3 | 8.72 | 79.7 | 11.5 | 75.9 |
| Jun. 19, 2001 | 12:20 | 800.5 | 250 | 22.57 | 1.76 | 17.0 | 34.0 | 2.76 | 26.0 | 2.96 | 12.4 | 8.79 | 77.0 | 12.0 | 73.4 |
| Jun. 19, 2001 | 13:20 | 801.5 | 250 | 22.55 | 1.74 | 17.5 | 34.0 | 2.83 | 26.0 | 3.01 | 12.2 | 8.65 | 77.6 | 11.7 | 74.0 |
| Jun. 19, 2001 | 14:15 | 802.4 | 250 | 22.75 | 1.75 | 17.0 | 34.0 | 2.82 | 27.0 | 3.10 | 12.3 | 8.72 | 78.0 | 11.7 | 74.4 |
| Jun. 19, 2001 | 15:30 | 803.7 | 250 | 22.77 | 1.77 | 17.5 | 34.0 | 2.88 | 26.0 | 3.08 | 11.9 | 8.44 | 77.1 | 11.5 | 73.5 |
| Jun. 19, 2001 | 16:15 | 804.4 | 250 | 22.75 | 1.76 | 17.5 | 34.0 | 2.88 | 26.0 | 3.06 | 12.0 | 8.51 | 77.7 | 11.5 | 74.1 |
| Jun. 20, 2001 | 10:20 | 807.4 | 250 | 22.70 | 1.77 | 18.0 | 33.5 | 2.80 | 27.0 | 3.12 | 12.2 | 8.65 | 76.8 | 11.8 | 73.2 |
| Jun. 20, 2001 | 11:45 | 808.8 | 250 | 22.90 | 1.76 | 18.0 | 33.5 | 2.84 | 26.0 | 3.01 | 12.2 | 8.65 | 77.9 | 11.6 | 74.3 |
| AVERAGE VALUES | | | 252 | 22.72 | 1.75 | 17.00 | 33.96 | 2.87 | 26.15 | 3.03 | 12.17 | 8.63 | 78.45 | 11.61 | 74.32 |

What is claimed is:

1. A method for producing sodium hypochlorite comprising:
   (a) piping brine solution to a first inlet in a first electrolyzer cell of an electrolyzer assembly while simultaneously piping chilled water from a chiller to the first inlet so that the brine solution combines with the chilled water, and electrolyzing the chilled brine solution in the first electrolyzer cell;
   (b) piping the hypochlorite and brine solution resulting from the electrolysis process occurring in step (a) to a second inlet in a second electrolyzer cell in the electrolyzer assembly while simultaneously piping chilled water from the chiller to the second inlet so that the chilled water combines with the hypochlorite and brine solution, and electrolyzing the chilled hypochlorite and brine solution;
   (c) piping the hypochlorite and brine solution resulting from the electrolysis process of step (b) to a third inlet in a third electrolyzer cell of the electrolyzer assembly while simultaneously piping chilled water from the chiller to the third inlet so that the chilled water combines with the hypochlorite and brine solution, and electrolyzing the resulting chilled hypochlorite and brine solution;
   (d) repeating step (c) until the hypochlorite and brine solution passes through all inlets of all cells of the eleotrolyzer assembly.

2. The method of claim 1 wherein the water is piped to a water softener unit prior to piping to the chiller.

3. The method of claim 2 wherein a portion of the water from the water softener unit is piped to a brine tank to combine with salt so as to form the brine solution of step (a) and the remaining water from the water softener is piped to the chiller.

4. A method for producing sodium hypochlorite comprising:
   (a) piping brine solution to a first inlet in a first electrolyzer cell of an electrolyzer assembly while simultaneously piping chilled water from a chiller to the first inlet so that the brine solution combines with the chilled water, and electrolyzing and the chilled brine solution in the first electrolyzer cell;
   (b) piping the hypochlorite and brine solution resulting from the electrolysis process occurring in step (a) to a second inlet in a second electrolyzer cell in the elctrolyzer assembly while simultaneously piping chilled water from the chiller to the second inlet so that the chilled water combines with the hypochlorite and brine solution, and electrolyzing the chilled hypochlorite and brine solution;
   (c) piping the hypochlorite end brine solution resulting from the electrolysis process of step (b) to a third inlet in a third electrolyzer cell of the electrolyzer assembly while simultaneously piping chilled water from the chiller to the third inlet so that the chilled water combines with the hypochlorite and brine solution, and electrolyzing the resulting chilled hypochlorite end brine solution;

(d) repeating step (c) until the hypochlorite and brine solution passes through all inlets of all cells of the electrolyzer assembly;

(e) piping the water to a water softener unit prior to piping to the chiller, and piping a portion of the water from the water softener unit to a brine tank to combine with salt so as to form the brine solution of step (a) and the remaining water from the water softener is piped to the chiller;

wherein the portion of the water from the water softener unit piped to a brine tank is within a range of approximately 5% to approximately 20% and the portion of water piped to the chiller is approximately 80% to 95%.

5. The method of claim 1 wherein each electrolyzer cell comprises one or more inlets for receiving chilled water and chilled water is piped to each inlet of the cell.

6. The method of claim 1 wherein the salt concentration of the brine solution piped to the first inlet is within a range between approximately 20 wt. per cent and saturation.

7. The method of claim 1 wherein chilled water/brine solution within the first electrolyzer cell comprises sodium chloride within a range of approximately 20 g/l to approximately 200 g/l.

8. The method of claim 1 wherein chilled water/brine solution within the first electrolyzer cell comprises approximately a range of from about 100 g/l sodium chloride to about 200 g/l sodium chloride.

9. The method of claim 1 wherein the composition of the effluent solution exiting the electrolyzer assembly comprises sodium hypochlorite within a range of approximately 5 g/l to approximately 15 g/l and sodium chloride within a range of approximately 12 g/l to approximately 25 g/l.

10. The method of claim 1 wherein the composition of the effluent solution exiting the electrolyzer assembly comprises approximately 10 g/l sodium hypochlorite and approximately 15 g/l sodium chloride.

11. The method of claim 1 wherein the temperature of the chilled water piped to the first inlet, the second inlet and the third inlet is within a range between approximately 10° C. and approximately 25° C.

12. The method of claim 1 wherein the temperature range of the chilled water piped to the first inlet, the second inlet and the third inlet is between approximately 15° C. and approximately 20° C.

13. The method of claim 1 wherein the electrolyzer assembly comprises a range of electrolyzer cells between 1 cell and 10 cells.

14. The method of claim 1 wherein the electrolyzer a assembly comprises 3 electrolyzer cells.

15. The method of claim 1 wherein the electrolyzer cell is a hypochlorite cell comprising unseparated anode and cathode plates.

16. The method of claim 1 wherein the electrolyzer cell comprises anode/cathode compartments, the number of compartments within a range of from about 1 compartment to about 15 compartments, each compartment separated from other compartments by a partition.

17. The method of claim 1 wherein the electrolyzer cell comprises a range of anode/cathode compartments from about 4 compartments to about 12 compartments.

18. The method of claim 1 wherein the current density within the electrolyzer assembly is within a range of from approximately 0.5 amps per square inch to 2 amps per square inch.

19. The method of claim 18 wherein the current density is 1.2 amps per square inch.

20. A method for producing sodium hypochlorite comprising:

(a) piping water to a water softener unit to reduce the calcium and magnesium content and piping a portion of the softened water to a brine tank containing solid salt to form a brine solution comprising salt within a range of between 20 weight per cent and saturation, piping a second portion of the softened water to a chiller;

(b) piping brine solution from the brine tank to a first Inlet In a first eletrolyzer cell of an electrolyzer assembly while simultaneously piping chilled water from the chiller having a temperature range from about 10° C. to about 25° C. to the first inlet so that the brine solution combines with the chilled water, and electrolyzing the chilled brine solution in the first electrolyzer cell;

(c) piping the hypochlorite and brine solution resulting from the electrolysis process occurring in step (b) to a second inlet in a second electrolyzer cell In the electrolyzer assembly while simultaneously piping chilled water from the chiller having a temperature range from about 10° C. to about 25° C. to the second inlet so that the chilled water combines with the hypochlorite and brine solution, and electrolyzing the chilled hypochlorite and brine solution;

(d) piping the hypochlorite and brine solution resulting from the electrolysis process of step (b) to a third inlet in a third electrolyzer cell of the electrolyzer assembly while simultaneously piping chilled water from the chiller having a temperature range from about 10° C. to about 25° C. to the third inlet so that the chilled water combines with the hypochlorite and brine solution, and electrolyzing the resulting chilled hypochlorite and brine solution;

(e) repeating step (c) until the hypochlorite and brine solution passes through all cells of the electrolyzer assembly and the effluent solution from the last cell comprises sodium hypochlorite within a range of approximately 5 g/l to approximately 15 g/l and sodium chloride within a range of approximately 12 g/l to approximately 25 g/l.

21. The method of claim 20 wherein chilled water/brine solution within the first electrolyzer cell comprises sodium chloride within a range of approximately 20 g/l to approximately 200 g/l.

22. The method of claim 20 wherein chilled water/brine solution within the first electrolyzer cell comprises a range from approximately 100 g/l sodium chloride to 200 g/l sodium chloride.

23. The method of claim 20 electrolyzer assembly comprises electrolyzer cells, the number of electrolyzer cells being a range between 1 cell and 10 cells.

24. The method of claim 20 wherein the electrolyzer cell is a hypochlorite cell comprising unseparated anode and cathode plates.

25. The method of claim 20 wherein the electrolyzer cell comprises anode/cathode compartments, the number of compartments within a range of from about 1 compartments to about 15 compartments.

26. The method of claim 20 wherein the current density within the electrolyzer assembly is within a range of from approximately 0.5 amps per square inch to 2 amps per square inch.

27. The method of claim 26 wherein the current density is 1.2 amps per square inch.

28. A method for producing sodium hypochlorite comprising:
 (a) piping water to a water softener unit to reduce the calcium and magnesium content and piping a portion of the softened water to a brine tank, the water combining with solid salt within the tank to form a brine solution comprising salt within a range between from about 20 weight per cent and saturation, piping a second portion of the softened water to a chiller;
 (b) piping brine solution from the brine tank to a first inlet in an electrolyzer cell of a one-cell electrolyzer assembly, the electrolyzer cell comprising at least two inlets, while simultaneously piping chilled water from the chiller having a temperature range from about 10° C. to about 25° C. to the first inlet so that the brine solution combines with the chilled water, and electrolyzing the chilled brine solution in the electrolyzer cell;
 (c) piping chilled water from the chiller having a temperature range from about 10° C. to about 25° C. to a second inlet, the second inlet, distal to the first inlet, so that the chilled water combines with the resulting hypochlorite and brine solution within the electrolyzer cell, and continuing to electrolyze the chilled hypochlorite and brine solution;
 (d) repeating step (c) until the hypochlorite and brine solution passes through the entire cell of the electrolyzer assembly.

29. The method of claim 28 wherein the electrolyzer cell comprises up to 6 inlets and chilled water is piped from the chiller having a temperature range from about 10° C. to about 25° C. to each inlet, so that the chilled water combines with the hypochlorite and brine solution within the electrolyzer cell, and continuing to electrolyze the chilled hypochlorite and brine solution.

30. The method of claim 28 wherein the electrolyzer cell is a hypochlorite cell comprising unseparated anode and cathode plates.

31. The method of claim 28 wherein the efficiency of the method is within a range from about 70% to about 80%.

32. A method for producing sodium hypochlorite comprising:
 (a) piping brine solution to a first inlet in a first electrolyzer cell of an electrolyzer assembly while simultaneously piping chilled water from the chiller to the first inlet so that the brine solution combines with the chilled water, and electrolyzing the chilled brine solution in the first electrolyzer cell;
 (b) piping the hypochlorite and brine solution resulting from the electrolysis process occurring in step (a) to a second inlet in a second electrolyzer cell in the electrolyzer assembly while simultaneously piping chilled water from the chiller to the second inlet so that the chilled water combines with the hypochlorite and brine solution, and electrolyzing the chilled hypochlorite and brine solution;
 (c) piping the hypochlorite and brine solution resulting from the electrolysis process of step (b) to a third inlet in a third electrolyzer cell of the electrolyzer assembly while simultaneously piping chilled water from the chiller to the third inlet so that the chilled water combines with the hypochlorite and brine solution, and electrolyzing the resulting chilled hypochlorite and brine solution;
 (d) repeating step (c) until the hypochlorite and brine solution passes through all cells of the electrolyzer assembly;
 wherein the efficiency of the method is within a range from about 70% to about 80%.

33. A method for producing sodium hypochlorite comprising:
 (a) piping water, the temperature of which, under ambient conditions, is 15° C. or below, to a water softener unit to reduce the calcium and magnesium content, and piping the softened water to a brine tank, the water combining with solid salt within the tank to form a brine solution;
 (b) piping brine solution to a first inlet in a first electrolyzer cell of an electrolyzer assembly while simultaneously piping water that is warmed to temperature of at least 15° C. by a heater, to the first inlet so that the brine solution combines with the warmed water, and electrolyzing the brine solution in the first electrolyzer cell;
 (c) piping the hypochlorite and brine solution resulting from the electrolysis process occurring in step (b) to a second inlet in a second electrolyzer cell in the electrolyzer assembly while simultaneously piping water at ambient temperature of 15° C. or below to the second inlet so that the water combines with the hypochlorite and brine solution, and electrolyzing the hypochlorite and brine solution;
 (d) piping the hypochlorite and brine solution resulting from the electrolysis process of step (c) to a third inlet in a third electrolyzer cell of the electrolyzer assembly while simultaneously piping water at ambient temperature of 15° C. or below to the third inlet so that the water combines with the hypochlorite and brine solution, and electrolyzing the resulting chilled hypochlorite and brine solution;
 (e) repeating step (d) until the hypochlorite and brine solution passes through all cells of the electrolyzer assembly.

34. The method of claim 33 wherein the number of inlets in each electrolyzer cell is within a range of from about one to about 6.

35. A method for producing potassium hypochlorite comprising:
 (a) piping potassium chloride solution to a first inlet in a first electrolyzer cell of an electrolyzer assembly while simultaneously piping chilled water from a chiller to the first Inlet so that the brine solution combines with the chilled water, and electrolyzing the chilled brine solution in the first electrolyzer cell;
 (b) piping the hypochlorite and brine solution resulting from the electrolysis process occurring in step (a) to a second inlet in a second electrolyzer cell in the electrolyzer assembly while simultaneously piping chilled water from the chiller to the second inlet so that the chilled water combines with the hypochlorite and brine solution, and electrolyzing the chilled hypochlorite and brine solution;
 (c) piping the hypochlorite and brine solution resulting from the electrolysis process of step (b) to a third inlet in a third electrolyzer cell of the electrolyzer assembly while simultaneously piping chilled water from the chiller to the third inlet so that the chilled water combines with the hypochlorite and brine solution, and electrolyzing the resulting chilled hypochlorite and brine solution;
 (d) repeating step (c) until the hypochlorite and brine solution passes through all inlets of all cells of the electrolyzer assembly.

* * * * *